(12) United States Patent
Nishimura et al.

(10) Patent No.: US 6,720,752 B2
(45) Date of Patent: Apr. 13, 2004

(54) PWM MOTOR DRIVING DEVICE

(75) Inventors: Kazuhiko Nishimura, Kyoto (JP); Kensuke Yasaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 25 days.

(21) Appl. No.: 10/082,177

(22) Filed: Feb. 26, 2002

(65) Prior Publication Data

US 2002/0089299 A1 Jul. 11, 2002

(30) Foreign Application Priority Data

Dec. 7, 1999 (JP) ......................................... H11-347196
Dec. 7, 1999 (JP) ......................................... H11-347197

(51) Int. Cl.[7] ............................................... H02P 3/08
(52) U.S. Cl. ........................ 318/599; 318/811; 318/254; 318/138; 318/439; 318/432; 318/434
(58) Field of Search ................................. 318/138, 254, 318/432, 434, 439, 599, 811

(56) References Cited

U.S. PATENT DOCUMENTS

| 5,220,207 A | * | 6/1993 | Kovalcik et al. | ............ | 307/350 |
| 5,306,988 A | * | 4/1994 | Carobolante et al. | ....... | 318/254 |
| 5,519,601 A | | 5/1996 | Close et al. | ................ | 318/811 |
| 5,535,115 A | * | 7/1996 | Kishi et al. | .................... | 363/98 |
| 5,656,897 A | * | 8/1997 | Carobolante et al. | ....... | 318/254 |
| 5,780,986 A | | 7/1998 | Shelton | ....................... | 318/811 |
| 5,869,946 A | | 2/1999 | Carobolante | ................ | 318/811 |

* cited by examiner

*Primary Examiner*—Rina I. Duda
(74) *Attorney, Agent, or Firm*—Arent Fox Kintner Plotkin & Kahn, PLLC

(57) ABSTRACT

In a PWM motor driving device, the amount of electric power supplied to a motor is controlled by controlling the ON/OFF duty factor of output transistors connected between a power source and the motor. This motor driving device has phase detecting circuits for detecting, among a plurality of phases of the motor, the phase which is currently being driven by the output transistors, and saturation preventing circuits for performing control according to the voltage of the phase detected by the phase detecting circuits in such a way that the output transistors are not saturated. Thus, the output transistors are controlled so as not to be saturated according to the voltage of, among the plurality of phases of the motor, the phase in which the motor is currently being driven by the output transistors. Thus, when the upper output transistors are undergoing PWM switching, the lower output transistors are controlled so as not to be saturated no longer according to the voltage of the phase in which the motor is currently being driven by the upper output transistors as practiced conventionally.

6 Claims, 15 Drawing Sheets

PWM MOTOR DRIVING DEVICE

BACKGROUND OF THE INVENTION

1. Field of the Invention

The present invention relates to a PWM (pulse-width modulation) motor driving device for driving a brushless DC (direct-current) motor, such as a capstan motor employed in a VCR (videocassette recorder), while controlling the rotation rate thereof by a PWM-based method.

2. Description of the Prior Art

FIG. 15 shows an example of the circuit configuration of the output stage of a motor driving device. In this figure, $T_{UU}$, $T_{VU}$, $T_{WU}$, $T_{UL}$, $T_{VL}$, and $T_{WL}$ represent NPN-type power transistors. $L_U$, $L_V$, and $L_W$ represent the coils of a motor for the U-, V-, and W-phases, respectively, that are connected in a Y-shaped connection. The transistors $T_{UU}$, $T_{VU}$, and $T_{WU}$ receive at their collectors a motor drive voltage $V_M$, and the transistors $T_{UL}$, $T_{VL}$, and $T_{WL}$ have their emitters connected to ground GND. The emitter of the transistor $T_{UU}$ and the collector of the transistor $T_{UL}$ are connected to the U-phase coil $L_U$ of the motor, the emitter of the transistor $T_{VU}$ and the collector of the transistor $T_{VL}$ are connected to the V-phase coil $L_V$ of the motor, and the emitter of the transistor $T_{WU}$ and the collector of the transistor $T_{WL}$ are connected to the W-phase coil of the motor.

For example, when, as indicated by an arrow $Y_1$ in FIG. 15, a current is passed from the U-phase coil $L_U$ of the motor to the V-phase coil $L_V$ thereof, the upper output transistor $T_{UU}$ and the lower output transistor $T_{VL}$ are turned ON. Here, in a PWM motor driving device, those transistors are, instead of one or both of them being kept ON, switched between ON and OFF at a predetermined frequency (hereinafter this will be called PWM switching). Thus, on the basis of the ON/OFF duty factor achieved by such PWM switching, the amount of electric power supplied to the motor, and thus the rotation rate thereof, is controlled.

In a device that drives a motor linearly, to prevent the upper output transistors from being saturated, the base currents thereof are controlled according to the highest among the U-phase voltage (the voltage at the node PU), the V-phase voltage (the voltage at the node PV), and the W-phase voltage (the voltage at the node PW); similarly, to prevent the lower output transistors from being saturated, the base currents thereof are controlled according to the lowest among the U-phase voltage, the V-phase voltage, and the W-phase voltage.

Here, for example, when the upper output transistor $T_{UU}$ turns from ON to OFF, the back electromotive force appearing in the coil $L_U$ causes, as indicated by an arrow $Y_2$ in FIG. 15, a current to flow through a diode D parasitic on the lower output transistor $T_{UL}$, and thereby causes the U-phase voltage to become lower than the ground level by the voltage drop across the diode D. As a result, whereas ideally the lowest voltage should appear in, among the U-, V-, and W-phases, the phase of whichever coil is currently being driven by the lower output transistors, actually a voltage lower than that appears in the phases of the other coils that are currently not being driven by the lower output transistors.

For this reason, in a PWM motor driving device, while the upper output transistors are undergoing PWM switching, if prevention of saturation of the output transistors is attempted by the method described above, the controlling of the base currents of the lower output transistors is attempted according to the voltage of the phase of the coil that is currently being driven by the upper output transistors, and therefore the lower output transistors cannot be properly prevented from saturation. Similarly, when the lower output transistors are undergoing PWM switching, the upper output transistors cannot be properly prevented from saturation.

Moreover, in a driving method based on PWM, since the coils of the motor are driven with pulses as described above, whereas good motor rotation efficiency can be achieved, smooth motor rotation cannot be obtained because the waveform of the currents obtained to be passed through the coils of the motor is not sinusoidal.

SUMMARY OF THE INVENTION

An object of the present invention is to provide a PWM motor driving device that achieves enhanced motor rotation characteristics by preventing saturation of output transistors.

Another object of the present invention is to provide a PWM motor driving device that produces less ripples in motor rotation.

To achieve the above objects, according to one aspect of the present invention, a PWM motor driving device that controls the amount of electric power supplied to a motor by controlling the ON/OFF duty factor of an output transistor connected between a power source and the motor is provided with: phase detecting means for detecting, among a plurality of phases of the motor, the phase which is currently being driven by the output transistor; and saturation preventing means for performing control according to the voltage of the phase detected by the phase detecting means in such a way that the output transistor is not saturated.

This circuit configuration permits the output transistors to be controlled so as not to be saturated according to the voltage of the phase in which the motor is currently being driven. Thus, for example, when the upper output transistors are undergoing PWM switching, the lower output transistors are controlled so as not to, be saturated no longer according to the voltage of the phase in which the motor is currently being driven by the upper output transistors as practiced conventionally. This helps obtain better motor rotation characteristics.

According to another aspect of the present invention, a PWM motor driving device that controls the amount of electric power supplied to a motor by controlling the ON/OFF duty factor of a switching device connected between a power source and the motor is provided with: ripple cancel signal generating means for generating, based on a signal representing the rotational position of the motor, a ripple cancel signal having a triangular waveform with maxima thereof synchronized with minima in torque; and duty factor controlling means for controlling the ON/OFF duty factor of the switching device according to a signal obtained by adding the torque control signal and the ripple cancel signal together.

This circuit configuration permits the ON/OFF duty factor, achieved by PWM switching, of the output transistors to be controlled according to a signal having a triangular waveform with maxima thereof synchronized with minima in torque. This makes it possible to pass more current at times of low torque and thereby achieve smoother motor rotation.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
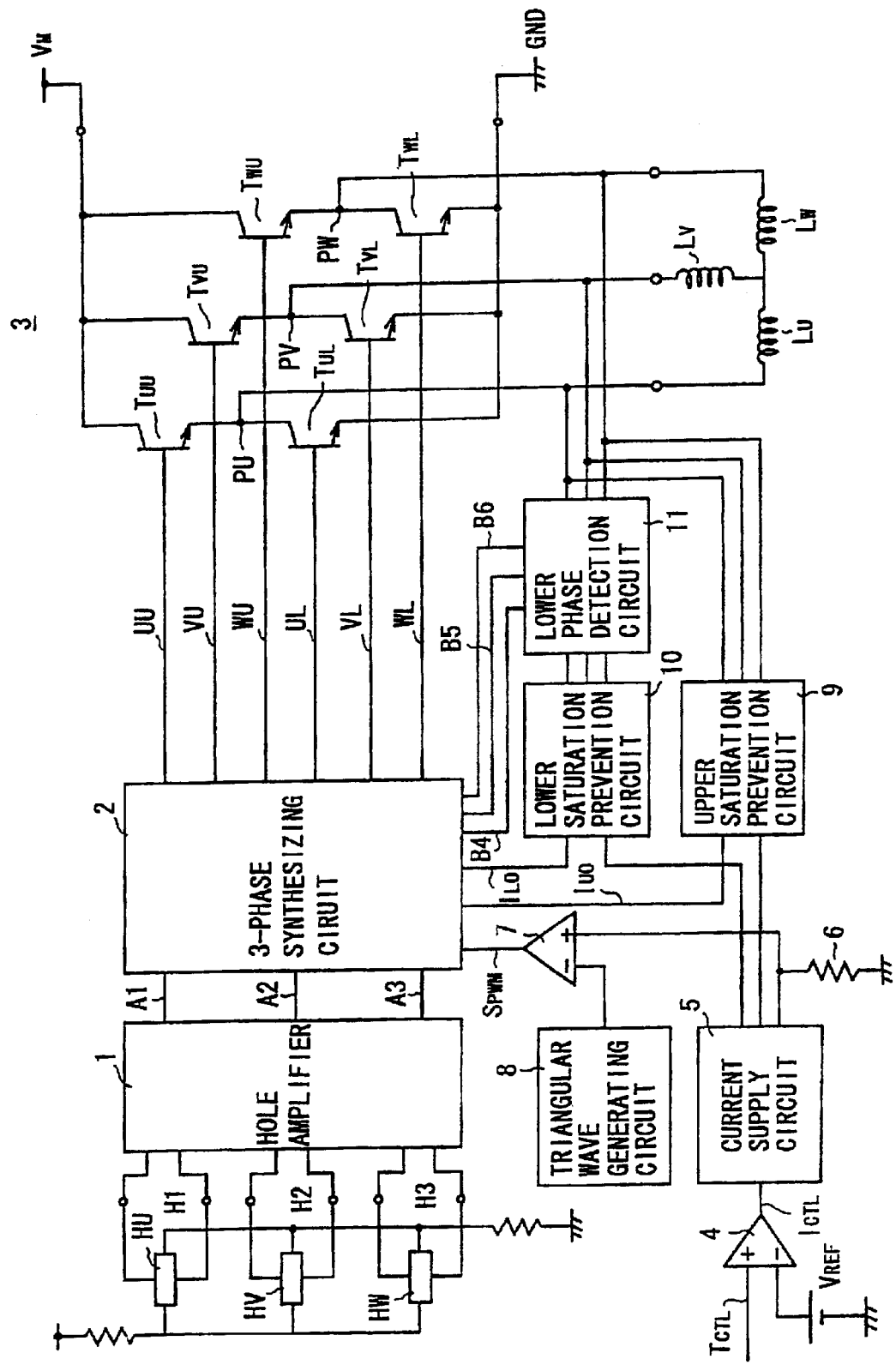
FIG. 1 is a block diagram of a PWM motor driving device embodying the invention.

Hereinafter, embodiments of the present invention will be described with reference to the drawings. FIG. 1 shows a block diagram of a PWM motor driving device embodying the invention. Hole devices HU, HV, and HW attached around the rotor, i.e. rotating portion, of a motor output hole signals H1, H2, and H3, respectively, which are then amplified by a hole amplifier 1 to become signals A1, A2, and A3 and are then fed to a three-phase synthesizing circuit 2. These three hole signals H1, H2, and H3 indicate the rotational position of the motor.

A control amplifier 4 receives, at its inverting input terminal (−), a reference voltage $V_{REF}$ and, at its non-inverting input terminal (+), a torque control signal $T_{CTL}$, which is a voltage signal. The control amplifier 4 outputs a current $I_{CTL}$ that varies according to the voltage difference between the voltages it receives at its inverting and non-inverting input terminals (−) and (+). Specifically, as the voltage of the torque control signal $T_{CTL}$ becomes higher relative to the reference voltage $V_{REF}$, the current $I_{CTL}$ output from the control amplifier 4 increases. A current supply circuit 5 supplies a current that increases and decreases with the current $I_{CTL}$ output from the control amplifier 4 to a resistor 6, an upper saturation prevention circuit 9, and a lower saturation prevention circuit 10.

The torque control signal $T_{CTL}$ is a signal output from a circuit (not shown) that detects the rotation rate of the motor and compares the detected rotation rate with the specified rotation rate. The voltage of the torque control signal $T_{CTL}$ becomes higher as the actual rotation rate of the motor becomes lower relative to the specified rotation rate, and the former becomes lower as the latter becomes higher. Thus, the current $I_{CTL}$ output from the control amplifier 4 is a signal that varies according to the error of the actual rotation rate of the motor relative to the specified rotation rate.

The current output from the current supply circuit 5 is converted by the resistor 6 into a voltage, which is fed to the non-inverting input terminal (+) of a PWM comparator 7. To its inverting input terminal (−), a high-frequency triangular wave output from a triangular wave generating circuit 8 is fed.

As a result, the PWM comparator 7 outputs a high-frequency binary signal (hereinafter called the PWM signal) $S_{PWM}$. The duty factor of the high-level period of this PWM signal $S_{PWM}$ relative to one period thereof becomes greater as the voltage of the torque control signal $T_{CTL}$ becomes higher, and the former becomes smaller as the latter becomes lower. The PWM signal $S_{PWM}$ is fed to the three-phase synthesizing circuit.

An output amplifier 3 is composed of NPN-type power transistors $T_{UU}$, $T_{VU}$, $T_{WU}$, $T_{UL}$, $T_{VL}$, and $T_{WL}$. The upper output transistors $T_{UU}$, $T_{VU}$, and $T_{WU}$ receive at their collectors a motor drive voltage $V_M$, and the lower output transistors $T_{UL}$, $T_{VL}$, and $T_{WL}$ have their emitters connected to ground GND. The emitter of the upper output transistor $T_{UU}$ and the collector of the lower output transistor $T_{UL}$ are connected to the U-phase coil $L_U$ of the motor, the emitter of the upper output transistor $T_{VU}$ and the collector of the lower output transistor $T_{VL}$ are connected to the V-phase coil $L_V$ of the motor, and the emitter of the upper output transistor $T_{WU}$ and the collector of the lower output transistor $T_{WL}$ are connected to the W-phase coil of the motor. The output transistors $T_{UU}$, $T_{VU}$, $T_{WU}$, $T_{UL}$, $T_{VL}$, and $T_{WL}$ receive, at their bases, currents UU, VU, WU, UL, VL, and WL, respectively, output from the three-phase synthesizing circuit 2.

Figure 3:
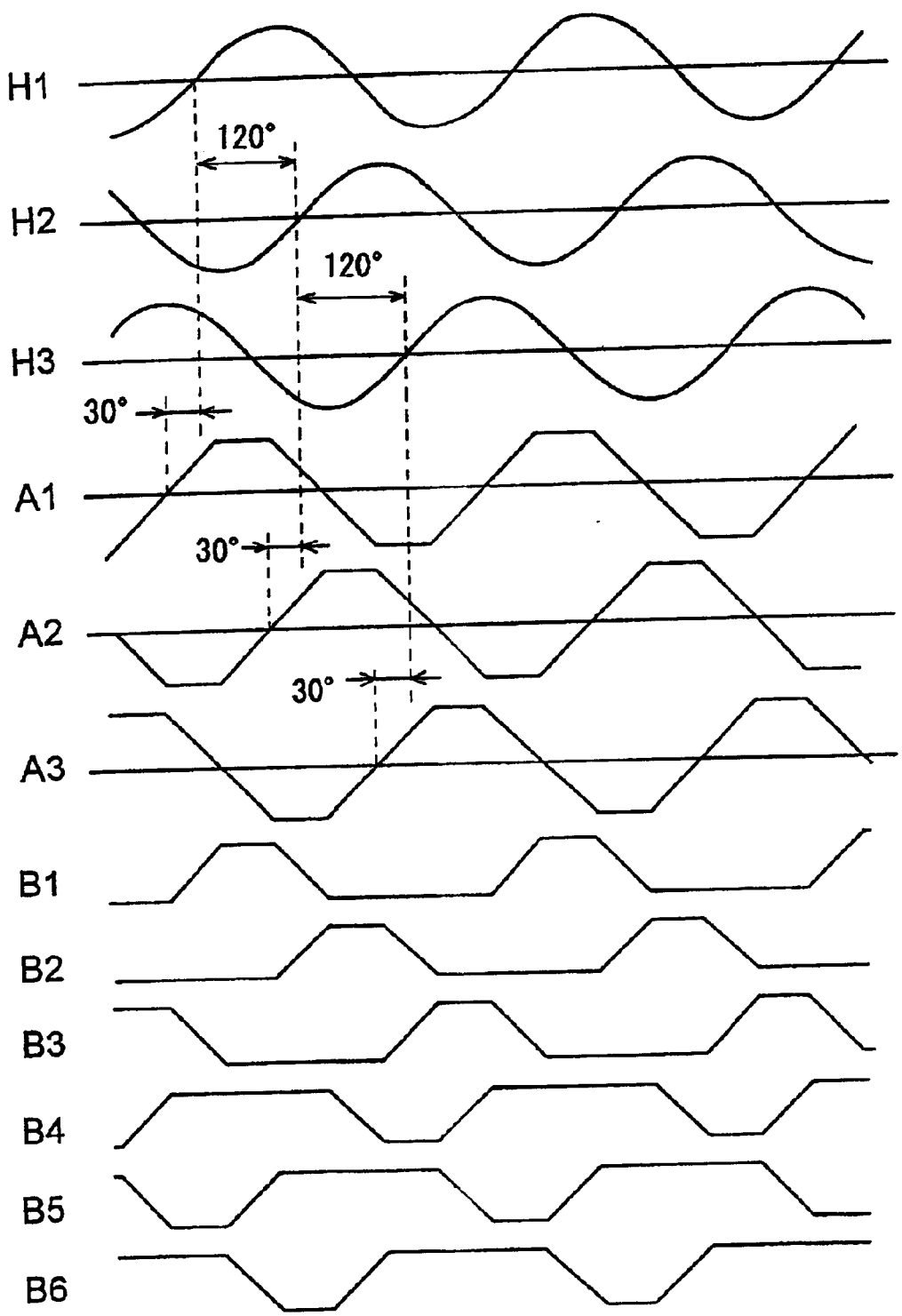
FIG. 3 is a timing chart of the signals observed at relevant points in FIG. 2.

As shown in FIG. 3, the hole signals H1, H2, and H3, which are output from the hole devices HU, HV, and HW, respectively, and which are sinusoidal waves displaced in phase by 120° relative to one another, are individually advanced in phase by 30° and then amplified by the hole amplifier 1 to become signals A1, A2, and A3.

Figure 2:
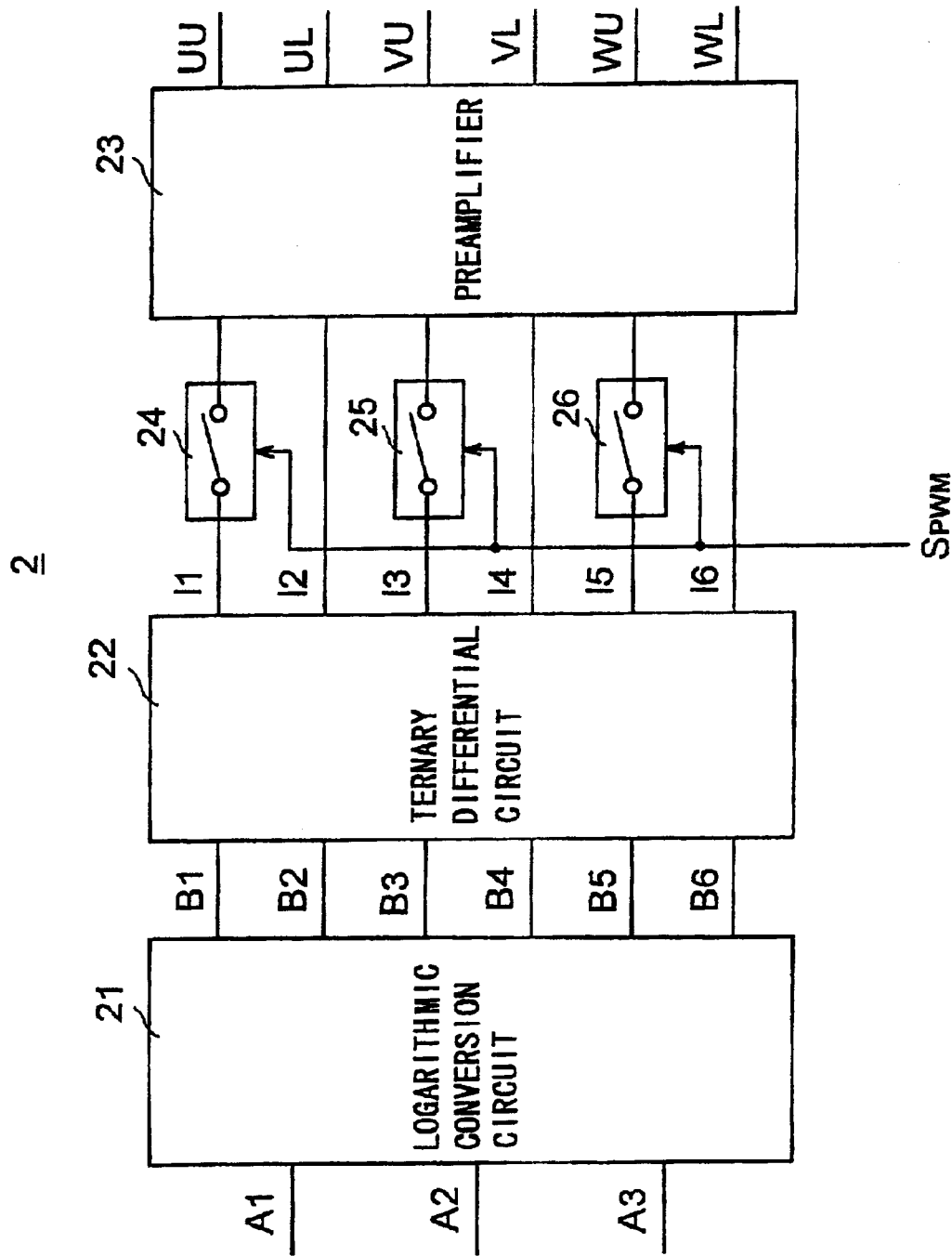
FIG. 2 is a diagram showing the internal circuit configuration of the three-phase synthesizing circuit shown in FIG. 1.

FIG. 2 shows the internal circuit configuration of the three-phase synthesizing circuit 2. As shown in FIG. 3, a logarithmic conversion circuit 21 extracts the positive portions of the signals A1, A2, and A3 to produce switching signals B1, B2, and B3, respectively, and extracts the negative portions of the signals A1, A2, and A3 to produce switching signals B4, B5, and B6, respectively.

Figure 4:
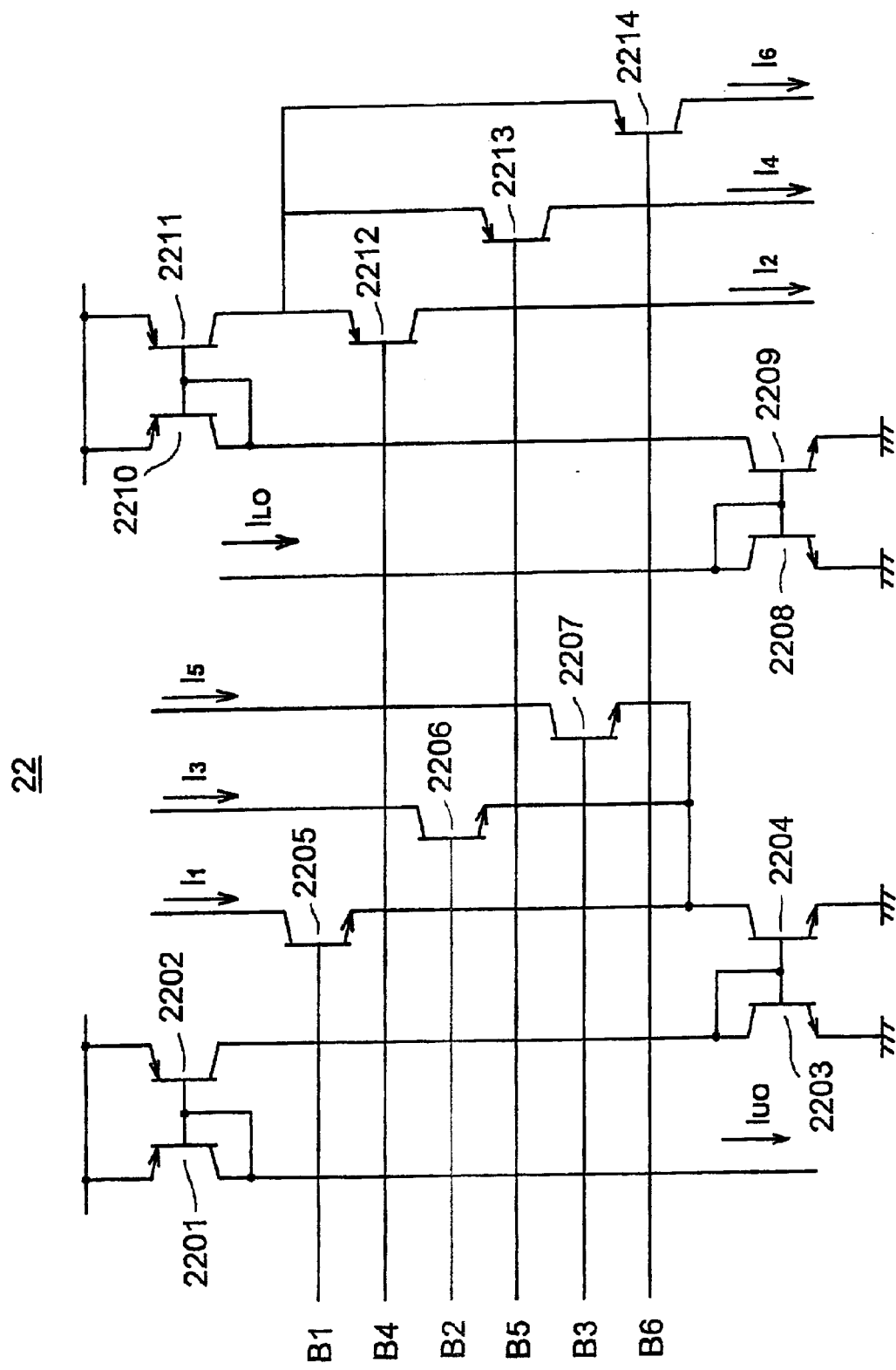
FIG. 4 is a circuit diagram of the ternary differential circuit shown in FIG. 2.

FIG. 4 shows the internal circuit configuration of the ternary differential circuit 22. PNP-type transistors 2201 and 2202 constitute a current mirror circuit. Through the input-side transistor 2201 flows, as its collector current, a current $I_{UO}$ output from the upper saturation prevention circuit 9, described later. On the other hand, the output-side transistor 2202 has its collector connected to the collector of an NPN-type transistor 2203.

The NPN-type transistor 2203, together with an NPN-type transistor 2204, constitutes a current mirror circuit. As described above, to the collector of the transistor 2203, the collector of the transistor 2202 is connected. To the collector of the transistor 2204, the emitters of NPN-type transistors 2205, 2206, and 2207 are connected.

NPN-type transistors 2208 and 2209 constitute a current mirror circuit. Through the input-side transistor 2208 flows, as its collector current, a current $I_{LO}$ output from the lower saturation prevention circuit 10, described later. On the other hand, the output-side transistor 2209 has its collector connected to the collector of an PNP-type transistor 2210.

The PNP-type transistor 2210, together with a PNP-type transistor 2211, constitutes a current mirror circuit. As described above, the transistor 2210 has its collector connected to the collector of the transistor 2209. The output-side transistor 2211 has its collector connected to the emitters of PNP-type transistors 2212, 2213, and 2214.

The transistor 2205 receives at its base the switching signal B1, the transistor 2206 receives at its base the switching signal B2, the transistor 2207 receives at its base the switching signal B3, the transistor 2212 receives at its base the switching signal B4, the transistor 2213 receives at its base the switching signal B5, and the transistor 2214 receives at its base the switching signal B6.

Through the transistors 2205, 2212, 2206, 2213, 2207, and 2214 flow, as their collector currents, currents I1, I2, I3, I4, I5, and I6 output from the ternary differential circuit 22. The currents I1, I2, I3, I4, I5, and I6 output from the ternary differential circuit 22 are amplified by the preamplifier 23 to become currents UU, UL, VU, VL, WU, and WL, respectively, and are then fed to the bases of the output transistors $T_{UU}$, $T_{UL}$, $T_{VU}$, $T_{VL}$, $T_{WU}$, and $T_{WL}$ of the output amplifier 3.

Of the currents output from the ternary differential circuit 22, the currents I1, I3, and I5 related to the currents fed to the bases of the upper output transistors $T_{UU}$, $T_{VU}$, and $T_{WU}$ are fed to the preamplifier 23 through switches 24, 25, and 26, respectively. These switches 24, 25, and 26 are kept ON when the PWM signal $S_{PWM}$ is at a high level and are kept OFF when the PWM signal $S_{PWM}$ is at a low level. Accordingly, the upper output transistors of the output amplifier 3 are switched between ON and OFF by PWM switching at the same frequency and by the same duty factor as the PWM signal $S_{PWM}$.

The circuit configuration described above permits appropriate switching of the coil to be driven according to the rotational position of the motor, and thereby makes the motor rotate. As the duty factor of the high-level period of the PWM signal $S_{PWM}$ relative to one period thereof becomes greater, the length of time for which the upper output transistors of the output amplifier 3 are kept ON by PWM switching becomes longer, and thus the amount of electric power supplied to the coil (in other words, the current with which the coils are driven) becomes larger, and thus, provided that the load on the motor is constant, the rotation rate of the motor becomes higher.

Moreover, as the current $I_{UO}$ output from the upper saturation prevention circuit 9 increases, the currents that flow into the bases of the upper output transistors increase; on the other hand, as the current $I_{LO}$ output from the lower saturation prevention circuit 10 increases, the currents that flow into the bases of the lower output transistors increase.

Figure 5:
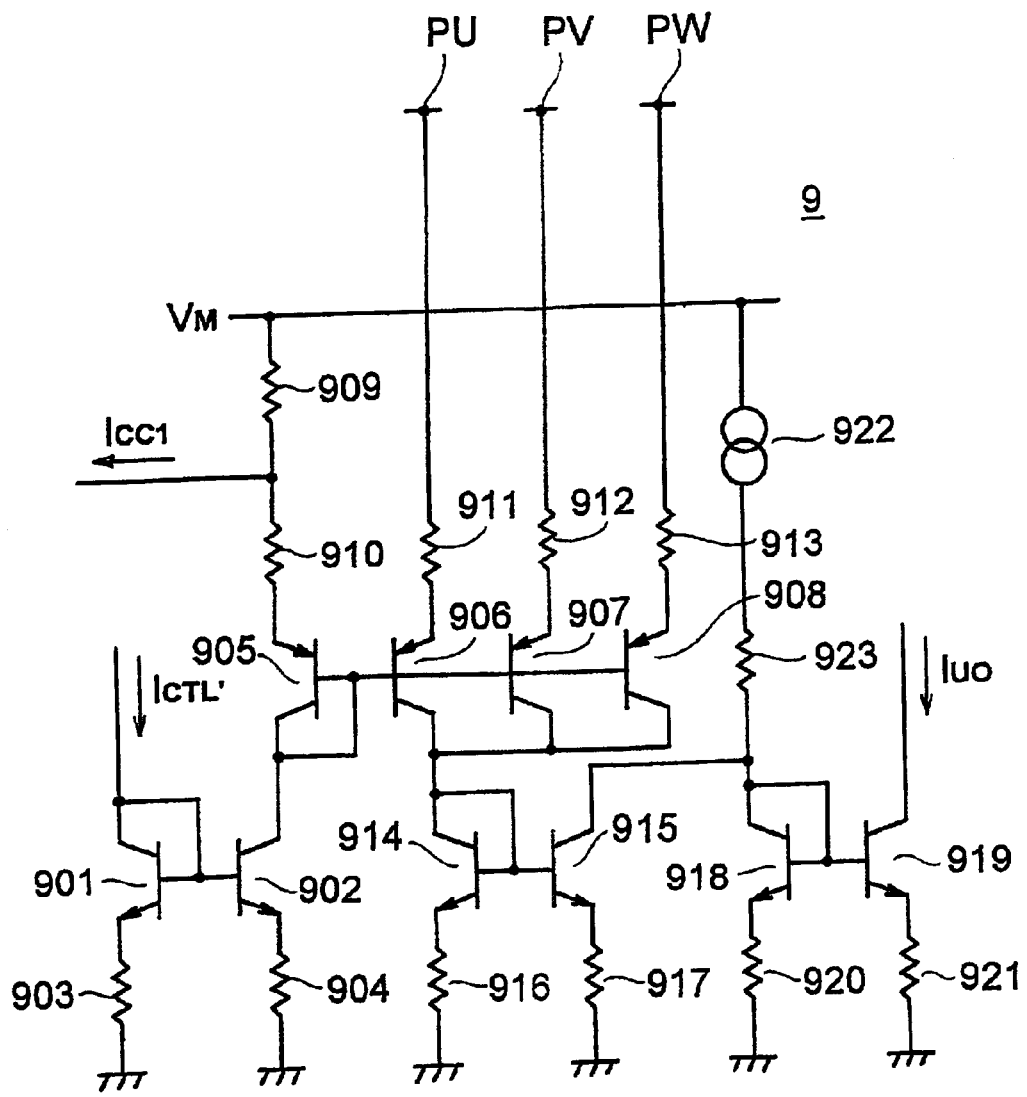
FIG. 5 is a circuit diagram of the upper saturation prevention circuit.

FIG. 5 shows the internal circuit configuration of the upper saturation prevention circuit 9. NPN-type transistors 901 and 902 constitute a current mirror circuit. The transistors 901 and 902 have their emitters grounded through resistors 903 and 904, respectively. The input-side transistor 901 receives at its collector the current $I_{CTL}'$ output from the current supply circuit 5. The output-side transistor 902 has its collector connected to the collector of a diode-connected PNP-type transistor 905.

The transistor 905 has its emitter connected to the motor drive voltage $V_M$ through two resistors 909 and 910 connected in series. From the node between the two resistors 909 and 910, a constant current $I_{CC1}$ flows out. PNP-type transistors 906, 907, and 908 have their bases connected together to the base of the transistor 905.

The emitter of the transistor 906 is connected through a resistor 911 to the node PU between the emitter of the upper output transistor $T_{UU}$ and the collector of the lower output transistor $T_{UL}$ within the output amplifier 3, the emitter of the transistor 907 is connected through a resistor 912 to the node PV between the emitter of the upper output transistor $T_{VU}$ and the collector of the lower output transistor $T_{VL}$ within the output amplifier 3, and emitter of the transistor 908 is connected through a resistor 913 to the node PW between the emitter of the upper output transistor $T_{WU}$ and the collector of the lower output transistor $T_{WL}$ within the output amplifier 3.

NPN-type transistors 914 and 915 constitute a current mirror circuit, with the transistor 914 placed on the input side and the transistor 915 placed on the output side. The transistor 914 has its emitter grounded through a resistor 916, and, to its collector, the collectors of the transistors 906, 907, and 908 are connected together. The transistor 915 has its emitter grounded through a resistor 917, and has its collector connected to the collector of an NPN-type transistor 918.

The NPN-type transistor 918, together with an NPN-type transistor 919, constitutes a current mirror circuit, with the transistor 918 placed on the input side and the transistor 919 placed on the output side. The transistors 918 and 919 have their emitters grounded through resistors 920 and 921, respectively. To the collector of the transistor 918, a constant current output from a constant-current source 922 is fed through a resistor 923. The current $I_{UO}$ that flows through the transistor 919 as its collector current is used as the output of the upper saturation prevention circuit 9. To the node between the constant-current source 922 and the resistor 923, a capacitor (not shown) is connected externally for phase compensation.

Configured as described above, the upper saturation prevention circuit 9 operates as follows. As the U-phase voltage (the voltage at the node PU), the V-phase voltage (the voltage at the node PV), and the W-phase voltage (the voltage at the node PW) become higher relative to the emitter-voltage of the transistor 905, the output current $I_{UO}$ decreases. As described previously, as the output current $I_{UO}$ decreases, the base currents of the upper output transistors $T_{UU}$, $T_{VU}$, and $T_{WU}$ of the output amplifier 3 decrease, and thus the U-phase, V-phase, and W-phase voltages become lower.

Thus, feedback control is exercised on the base currents of the upper output transistors of the output amplifier 3 in such a way that the highest among the U-phase, V-phase, and W-phase voltages is limited below a specified upper limit voltage (the emitter voltage of the transistor 905). In this way, saturation of the upper output transistors $T_{UU}$, $T_{VU}$, and $T_{WU}$ is prevented.

Here, let the resistances of the resistors 909 and 910 be R1 and R2, respectively, then the emitter voltage $V_E$ of the transistor 905 is given by $$V_E = V_M - I_{CC1} \cdot R1 - I_{CTL}' \cdot (R1+R2)$$

which means that it varies according to the output current $I_{CTL}'$ of the current supply circuit 5. Thus, the saturation prevention level of the upper output transistors (the upper limit of the U-phase, V-phase, and W-phase voltages) is controlled according to the torque control signal $T_{CTL}$. This enhances controllability of the rotation rate of the motor.

Figure 6:
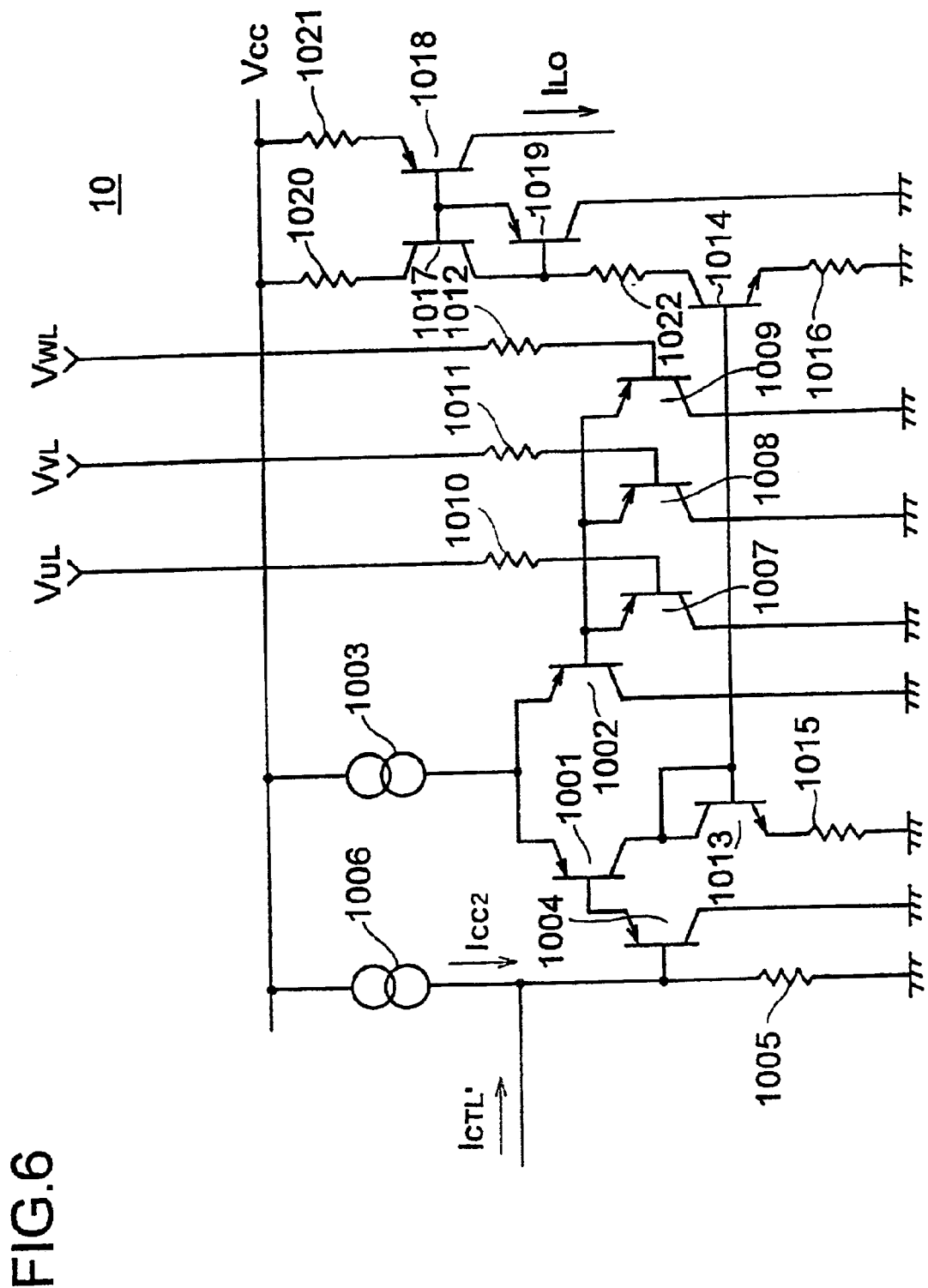
FIG. 6 is a circuit diagram of the lower saturation prevention circuit.

FIG. 6 shows the internal circuit configuration of the lower saturation prevention circuit 10. PNP-type transistors 1001 and 1002 have their emitters connected together to a constant-current source 1003. The transistor 1001 has its base connected to the emitter of a PNP-type transistor 1004. The transistor 1004 has its base grounded through a resistor 1005. To the node between the transistor 1004 and the resistor 1005, a constant current $I_{CC2}$ output from a constant-current circuit 1006 and the current $I_{CTL}'$ output from the current supply circuit 5 flow in.

The transistor 1002 has its base connected to the emitters of PNP-type transistors 1007, 1008, and 1009. The transistors 1002, 1007, 1008, and 1009 have their collectors grounded. The transistors 1007, 1008, and 1009 receive at their bases three voltages $V_{UL}$, $V_{VL}$, and $V_{WL}$ output from a lower phase detection circuit 11, described later, through resistors 1010, 1011, and 1012, respectively.

The transistor 1001 has its collector connected to the collector of an NPN-type transistor 1013. The NPN-type transistor 1013, together with an NPN-type transistor 1014, constitutes a current mirror circuit, with the transistor 1013 placed on the input side and the transistor 1014 placed on the output side. The transistors 1013 and 1014 have their emitters grounded through resistors 1015 and 1016, respectively.

PNP-type transistors 1017, 1018, and 1019 constitute a current mirror circuit. The input-side transistor 1017 and the output-side transistor 1018 have their emitters connected to the supplied voltage $V_{CC}$ through resistors 1020 and 1021, respectively. The input-side transistor 1017 has its collector connected to the collector of the transistor 1014 through a resistor 1022. The current $I_{LO}$ that flows through the transistor 1018 as its collector current is used as the output of the lower saturation prevention circuit 10. To the node between the collector of the transistor 1014 and the resistor 1022, a capacitor (not shown) is connected externally for phase compensation.

Configured as described above, the lower saturation prevention circuit 10 operates as follows. As the three voltages $V_{UL}$, $V_{VL}$, and $V_{WL}$ output from the lower phase detection circuit 11 become lower relative to the base voltage of the transistor 1004, the output current $I_{LO}$ decreases. As described previously, as the output current $I_{LO}$ decreases, the base currents of the lower output transistors $T_{UL}$, $T_{VL}$ and $T_{WL}$ of the output amplifier 3 decrease, and thus the U-phase, V-phase, and W-phase voltages become higher.

Thus, feedback control is exercised on the base currents of the lower output transistors of the output amplifier 3 in such a way that the lowest among the three voltages $V_{UL}$, $V_{VL}$, and $V_{WL}$ output from the lower phase detection circuit 11 is limited above a specified lower limit voltage (the base voltage of the transistor 1004).

Here, let the resistance of the resistor 1005 be R, then the base voltage $V_B$ of the transistor 1004 is given by $$V_B = (I_{CTL}' + I_{CC2}) \cdot R$$

which means that it varies according to the output current $I_{CTL}'$ of the current supply circuit 5. Thus, the saturation prevention level of the lower output transistors (the lower limit of the U-phase, V-phase, and W-phase voltages) is controlled according to the torque control signal $T_{CTL}$. This enhances controllability of the rotation rate of the motor.

Figure 7:
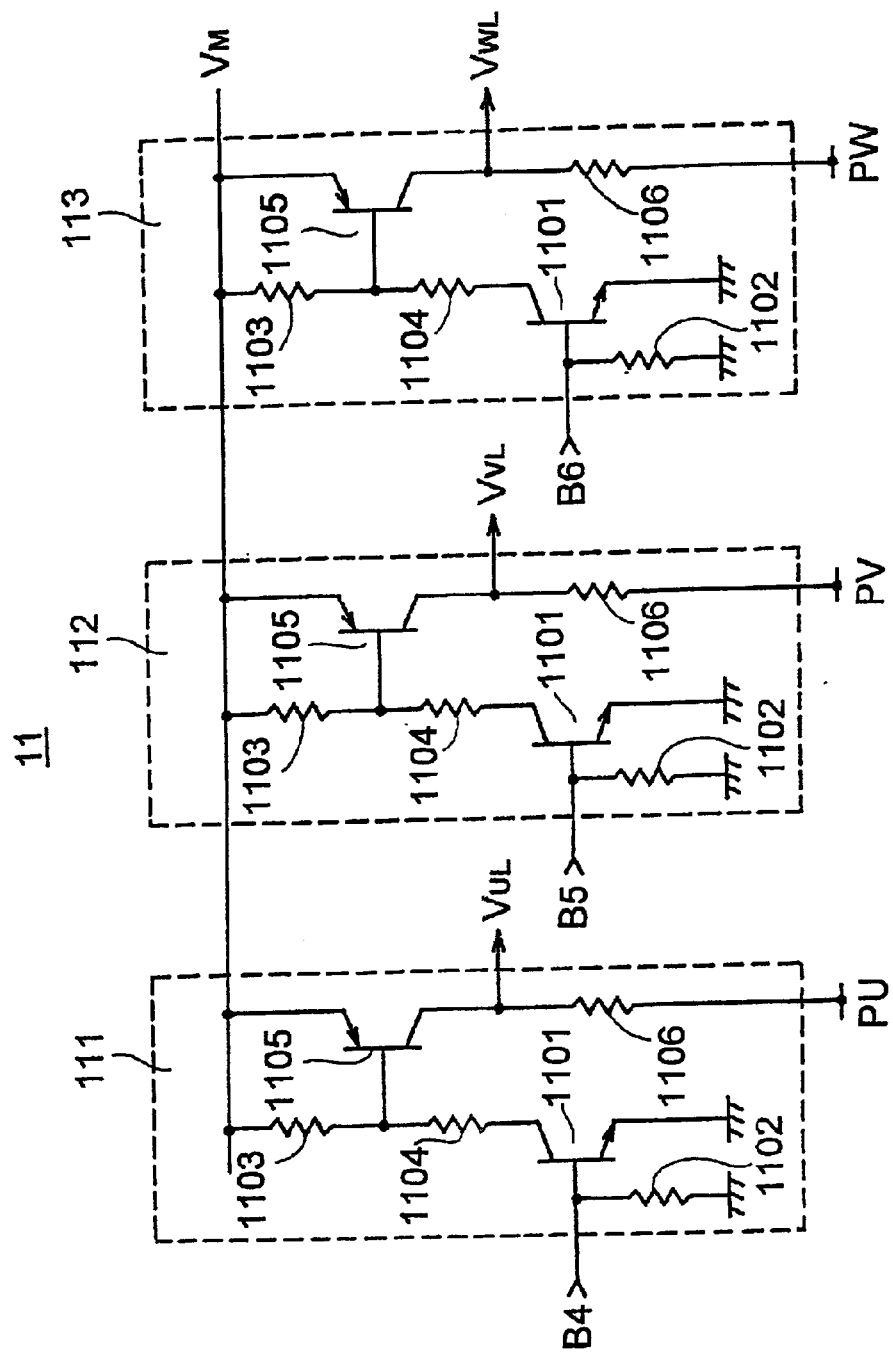
FIG. 7 is a circuit diagram of the lower phase detection circuit.

The lower phase detection circuit 11, as shown in FIG. 7, which shows its internal circuit configuration, is composed of a first circuit 111, a second circuit 112, and a third circuit 113. The first circuit 111 is configured as follows. An NPN-type transistor 1101 has its base grounded through a resistor 1102, has its emitter grounded, and has its collector connected to the motor drive voltage $V_M$ through two resistors 1103 and 1104 connected in series. To the node between the base of the transistor 1101 and the resistor 1102, a signal corresponding to the switching signal B4 produced by the three-phase synthesizing circuit 2 is fed. A PNP-type transistor 1105 has its base connected to the node between the resistors 1103 and 1104, has its emitter connected to the motor drive voltage $V_M$, and has its collector connected to the node PU within the output amplifier 3 through a resistor 1106.

The second and third circuits 112 and 113 have the same circuit configuration as the first circuit 111, and therefore their description will be omitted. The only differences with the second and third circuits 112 and 113, respectively, are that the signals fed to the node between the base of the transistor 1101 and the resistor 1102 are signals corresponding to the switching signals B5 and B6 produced by the three-phase synthesizing circuit 2, and that the destinations to which the collector of the transistor 1105 is connected through the resistor 1106 are the nodes PV and PW within the output amplifier 3. The three voltages $V_{UL}$, $V_{VL}$, and $V_{WL}$ appearing at the node between the transistor 1105 and the resistor 1106 in the first, second, and third circuits 111, 112, and 113, respectively, are used as the outputs of the lower phase detection circuit 11.

Configured as described above, the lower phase detection circuit 11 operates as follows. In the first circuit 111, when the switching signal B4 is at a low level, the transistor 1101 is OFF, and thus the transistor 1105 is OFF, with the result that the first circuit 111 outputs the U-phase voltage; on the other hand, when the switching signal B4 is at a high level, the transistor 1101 is ON, and thus the transistor 1105 is ON, with the result that the first circuit 111 outputs a voltage approximately equal to the motor drive voltage $V_M$.

Likewise, the second circuit 112, when the switching signal B5 is at a low level, outputs the V-phase voltage, and, when the switching signal B5 is at a high level, outputs a voltage approximately equal to the motor drive voltage $V_M$. Likewise, the third circuit 113, when the switching signal B6 is at a low level, outputs the W-phase voltage, and, when the switching signal B6 is at a high level, outputs a voltage approximately equal to the motor drive voltage $V_M$.

In summary, the voltage output from the lower phase detection circuit 11 as the voltage of the phase of whichever coil is currently being driven by the lower output transistors always has a value lower than the voltages of the other phases. This is because, when any of the switching signals B4, B5, and B6 is at a low level, the lower output transistor $T_{UL}$, $T_{VL}$, or $T_{WL}$, respectively, drives the U-phase, V-phase, or W-phase coil $L_U$, $L_V$, or $L_W$, respectively.

In this way, by the operation of the lower saturation prevention circuit 10 and the lower phase detection circuit 11, the voltage of the phase of whichever coil is currently being driven by the lower output transistors of the output amplifier 3 is kept above the specified lower limit voltage (specifically, the base voltage of the transistor 1004), and thus saturation of the lower output transistors $T_{UL}$, $T_{VL}$, and, $T_{WL}$ is prevented.

As described above, in this embodiment, the base currents of the lower output transistors are controlled so as not to saturate those transistors on the basis of the voltage of the phase of whichever coil is currently being driven by the lower output transistors of the output amplifier 3. Thus, even though the upper output transistors of the output amplifier 3 are switched between ON and OFF by PWM switching, the base currents of the lower output transistors are controlled so as not to saturate those transistors no longer on the basis of the voltage of the phase of whichever coil is currently being driven by the upper output transistors as practiced conventionally. This enhances motor rotation characteristics.

Figure 8:
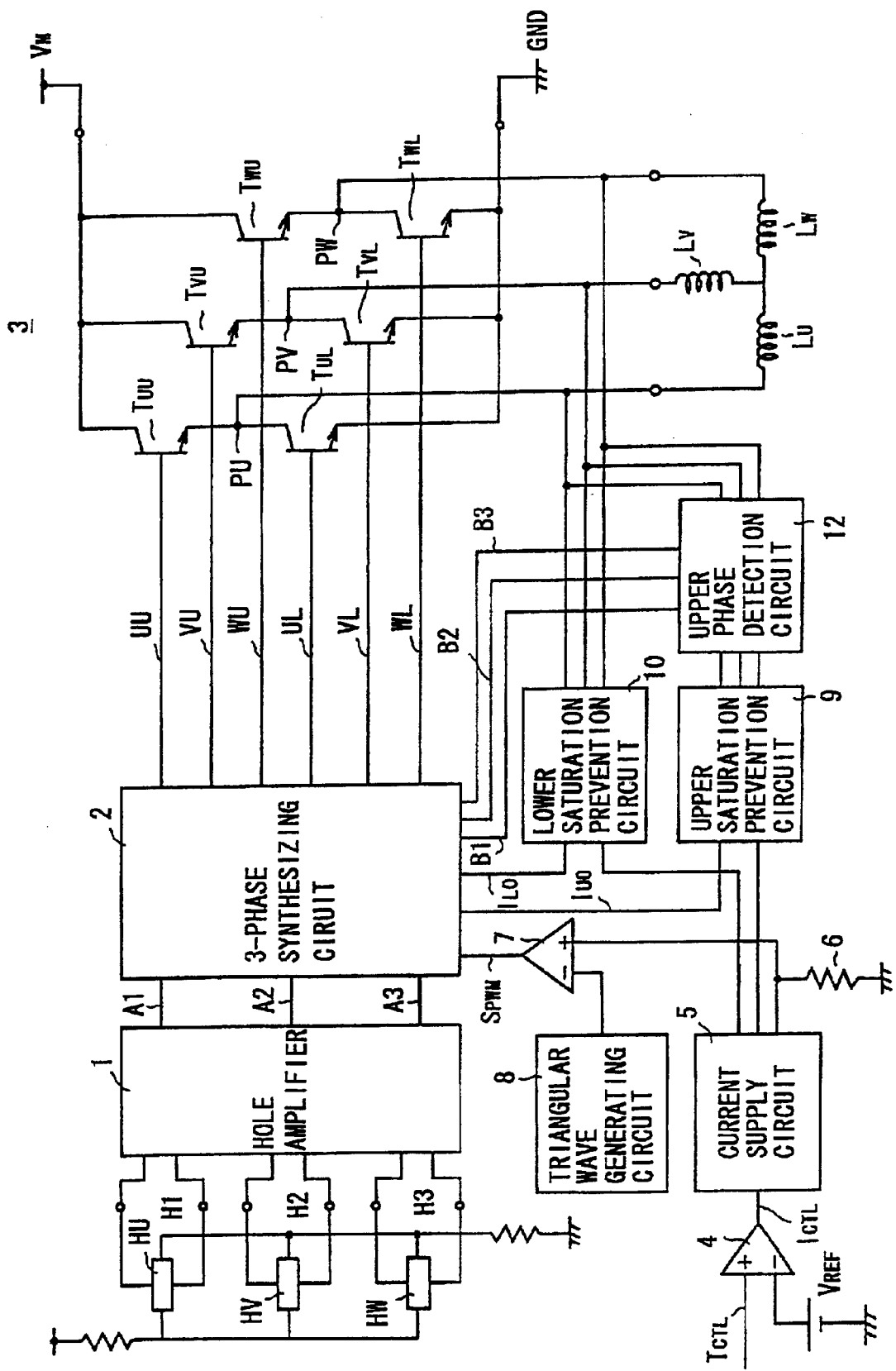
FIG. 8 is a block diagram of another PWM motor driving device embodying the invention.

In a case where the lower output transistors of the output amplifier 3 are switched between ON and OFF by PWM switching, as shown in FIG. 8, the circuit configuration is so modified that the signals output from an upper phase detection circuit 12 are fed to the upper saturation prevention circuit 9. In this case, the lower saturation prevention circuit 10 receives, instead of the three voltages $V_{UL}$, $V_{VL}$, and $V_{WL}$ output from the lower phase detection circuit 11, the U-phase, V-phase, and W-phase voltages, respectively.

Figure 9:
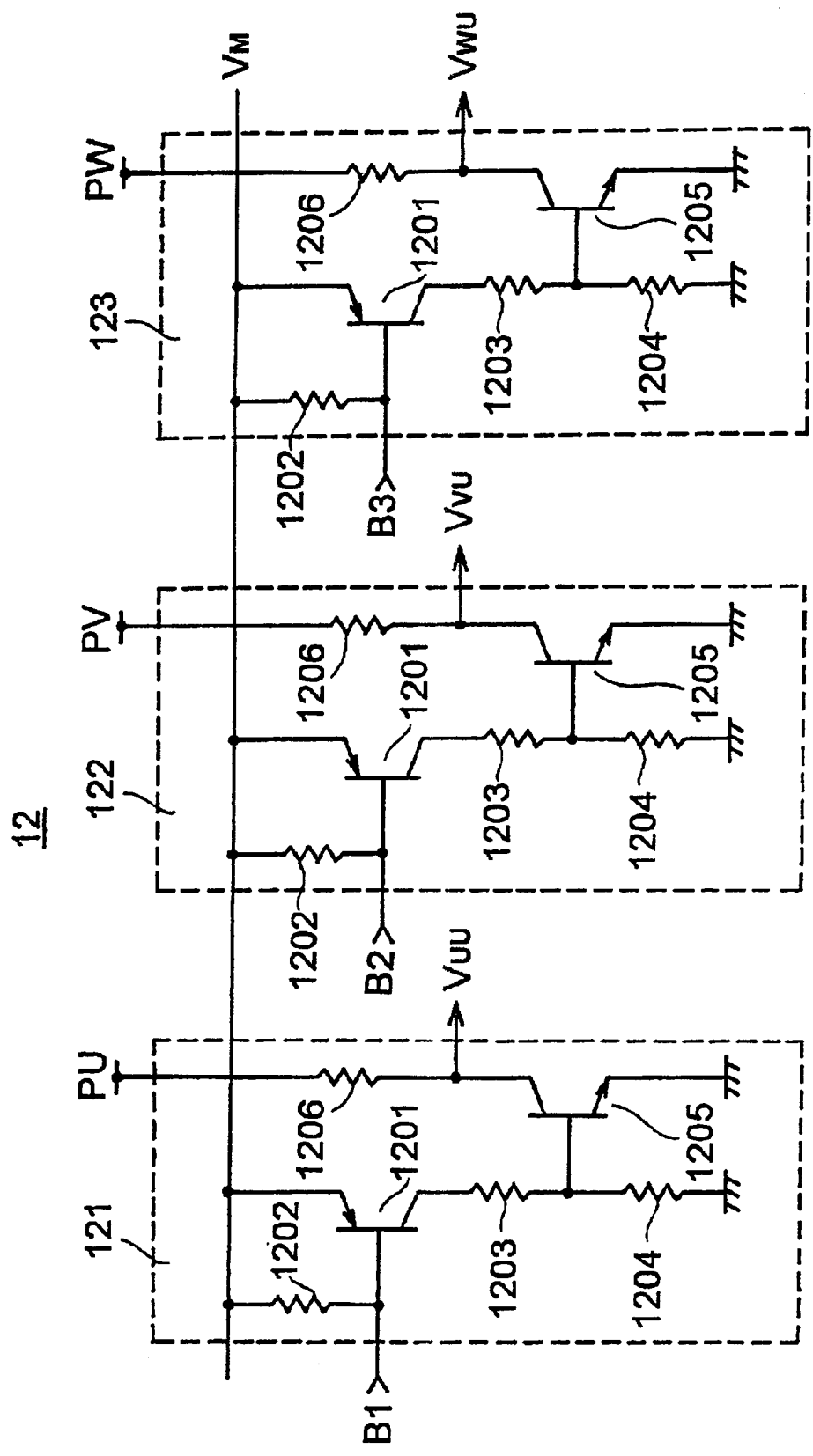
FIG. 9 is a circuit diagram of the upper phase detection circuit.

FIG. 9 shows the internal circuit configuration of the upper phase detection circuit 12. The upper phase detection circuit 12 is composed of a first circuit 121, a second circuit 122, and a third circuit 123. The first circuit 121 is configured as follows. A PNP-type transistor 1201 has its base connected to the motor drive voltage $V_M$ through a resistor 1202, has its emitter connected to the motor drive voltage $V_M$, and has its collector grounded through two resistors 1203 and 1204 connected in series.

To the node between the base of the transistor 1201 and the resistor 1202, a signal corresponding to the switching signal B1 produced by the three-phase synthesizing circuit 2 is fed. An NPN-type transistor 1205 has its base connected to the node between the resistors 1203 and 1204, has its emitter grounded, and has its collector connected to the node PU within the output amplifier 3 through a resistor 1206.

The second and third circuits 122 and 123 have the same circuit configuration as the first circuit 121, and therefore their description will be omitted. The only differences with the second and third circuits 122 and 123, respectively, are that the signals fed to the node between the base of the transistor 1201 and the resistor 1202 are signals corresponding to the switching signals B2 and B3 produced by the three-phase synthesizing circuit 2, and that the destinations to which the collector of the transistor 1205 is connected through the resistor 1206 are the nodes PV and PW within the output amplifier 3. The three voltages $V_{UU}$, $V_{VU}$, and $V_{WU}$ appearing at the node between the transistor 1205 and the resistor 1206 in the first, second, and third circuits 121, 122, and 123, respectively, are fed to the upper saturation prevention circuit 9.

Configured as described above, the upper phase detection circuit 12 operates as follows. In the first circuit 121, when the switching signal B1 is at a high level, the transistor 1201 is OFF, and thus the transistor 1205 is OFF, with the result that the first circuit 121 outputs the U-phase voltage; on the other hand, when the switching signal B1 is at a low level, the transistor 1201 is ON, and thus the transistor 1205 is ON, with the result that the first circuit 121 outputs a voltage approximately equal to the ground level.

Likewise, the second circuit 122, when the switching signal B2 is at a high level, outputs the V-phase voltage, and, when the switching signal B2 is at a low level, outputs a voltage approximately equal to the ground level. Likewise, the third circuit 123, when the switching signal B3 is at a high level, outputs the W-phase voltage, and, when the switching signal B3 is at a low level, outputs a voltage approximately equal to the ground level.

In summary, the voltage output from the upper phase detection circuit 12 as the voltage of the phase of whichever coil is currently being driven by the upper output transistors always has a value higher than the voltages of the other phases. This is because, when any of the switching signals B1, B2, and B3 is at a high level, the upper output transistor $T_{UU}$, $T_{VU}$, or $T_{WU}$, respectively, drives the U-phase, V-phase, or W-phase coil $L_U$, $L_V$, or $L_W$, respectively.

In this way, by feeding the outputs of the upper phase detection circuit 12 to the upper saturation prevention circuit 9, the base currents of the upper output transistors are controlled so as not to saturate those transistors on the basis of the voltage of the phase of whichever coil is currently being driven by the upper output transistors of the output amplifier 3. This enhances motor rotation characteristics.

In a case where both the upper and lower output transistors of the output amplifier 3 are switched between ON and OFF by PWM switching, the circuit configuration is so modified as to include both the lower phase detection circuit 11 and the upper phase detection circuit 12.

Figure 10:
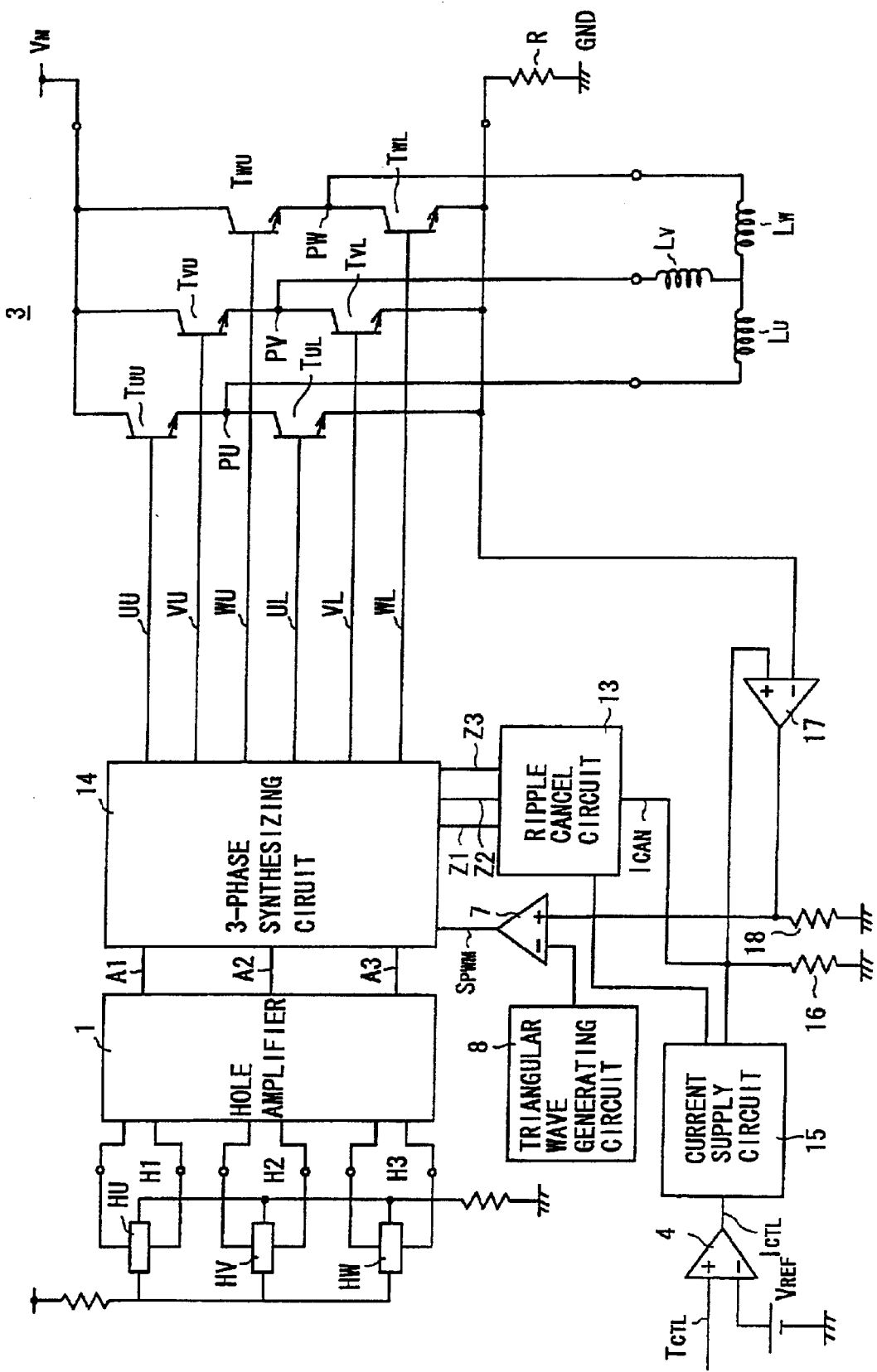
FIG. 10 is a block diagram of still another PWM motor driving device embodying the invention.

FIG. 10 shows a block diagram of still another PWM motor driving device embodying the invention. In this figure, such circuit elements as are found also in FIG. 1, which is a block diagram of the previously described embodiment, are identified with the same reference numerals, and their descriptions will be omitted.

The hole signals A1, A2, and A3 output from the hole amplifier 1 are fed to a three-phase synthesizing circuit 14. The lower output transistors $T_{UL}$, $T_{VL}$, and $T_{WL}$ of the output amplifier 3 have their emitters connected to ground GND through a resistor R. A current supply circuit 15 feeds a ripple cancel circuit 13 and a resistor 16 with a current that increases and decreases with the current $I_{CTL}$ output from the control amplifier 4.

The current $I_{CTL}$ output from the control amplifier 4 and the current $I_{CAN}$ output from the ripple cancel circuit 13 are added together, and the sum current is converted by the resistor 16 into a voltage, which is fed to the non-inverting input terminal (+) of a current feedback amplifier 17. On the other hand, to its inverting input terminal (−), the voltage across the resistor R, and thus a voltage that varies according to the current with which the motor is driven, is fed.

The current feedback amplifier 17 outputs a current $I_{FS}$ that varies according to the voltage difference between the voltages fed to its non-inverting and inverting input terminals (+) and (−). Specifically, as the sum current of the current $I_{CTL}$ output from the control amplifier 4 and the current $I_{CAN}$ output from the ripple cancel circuit 13 increases, and as the motor drive current decreases, the current $I_{FS}$ output from the current feedback amplifier 17 increases.

The current $I_{FS}$ output from the current feedback amplifier 17 is converted by a resistor 18 into a voltage, which is fed to the non-inverting input terminal (+) of the PWM comparator 7. On the other hand, to its inverting input terminal (−), a high-frequency triangular wave output from the triangular wave generating circuit 8 is fed.

As a result, the duty factor of the high-level period of the PWM signal $S_{PWM}$, which is a high-frequency binary signal output from the PWM comparator 7, relative to one period thereof is controlled according to, as well as the torque control signal $T_{CTL}$ and the motor drive current, the current $I_{CAN}$ output from the ripple cancel circuit 13. Specifically, as the voltage of the torque control signal $T_{CTL}$ becomes higher, as the current $I_{CAN}$ output from the ripple cancel circuit 13 increases, and as the motor drive current decreases, the duty factor of the high-level period of the PWM signal $S_{PWM}$ relative to one period thereof becomes greater.

Figure 11:
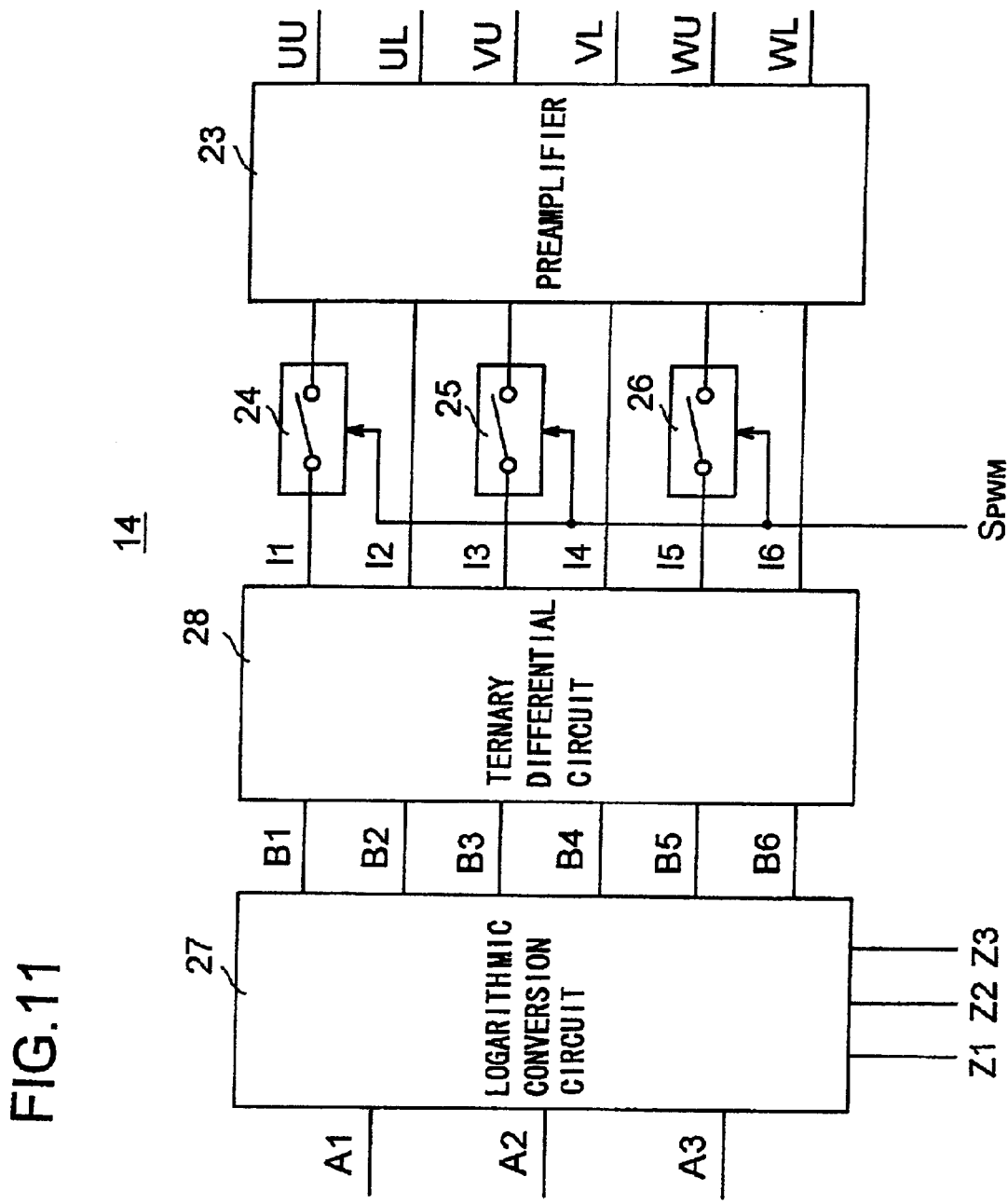
FIG. 11 is a diagram showing the internal circuit configuration of the three-phase synthesizing circuit shown in FIG. 10.

FIG. 11 shows the internal circuit configuration of the three-phase synthesizing circuit 14. This three-phase synthesizing circuit 14 has the same configuration as the three-phase synthesizing circuit 2 shown in FIG. 2 of the previously described embodiment except that the former has a logarithmic conversion circuit 27 and a ternary differential circuit 28 in place of the logarithmic conversion circuit 21 and the ternary differential circuit 22 of the latter, and therefore descriptions will be given only of the logarithmic conversion circuit 27 and the ternary differential circuit 28.

Figure 12:
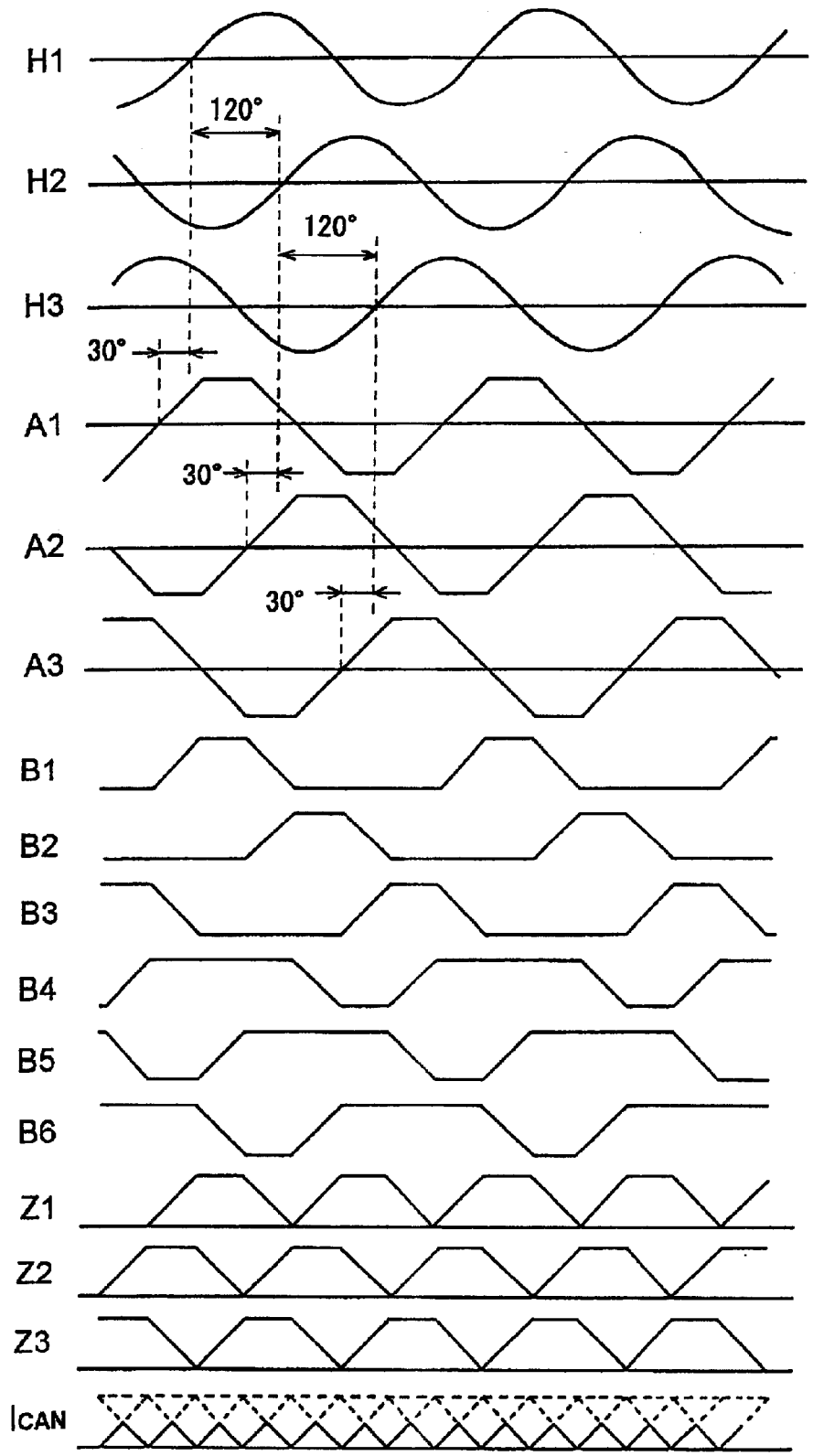
FIG. 12 is a timing chart of the signals observed at relevant points in FIG. 11.

As shown in FIG. 12, the logarithmic conversion circuit 27 extracts the positive portions of the signals A1, A2, and A3 to produce switching signals B1, B2, and B3, respectively, and extracts the negative portions of the signals A1, A2, and A3 to produce switching signals B4, B5, and B6, respectively. In addition, the logarithmic conversion circuit 27 produces absolute value signals Z1, Z2, and Z3 by taking the absolute values of the signals A1, A2, and A3, respectively. These absolute value signals Z1, Z2, and Z3 are fed to the ripple cancel circuit 13.

Figure 13:
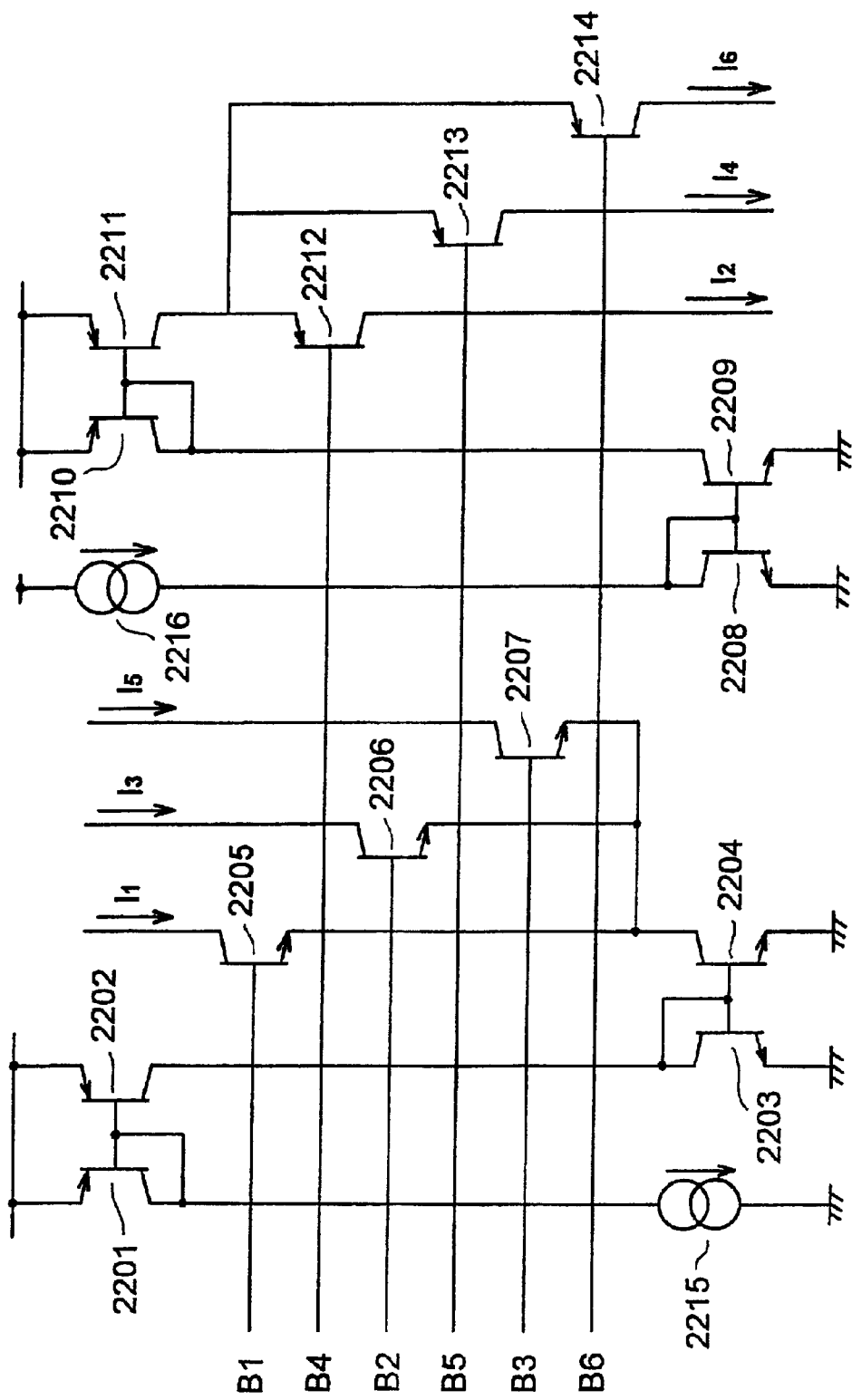
FIG. 13 is a circuit diagram of the ternary differential circuit shown in FIG. 11.

The ternary differential circuit 28, as shown in FIG. 13, which shows its internal circuit configuration, differs from the ternary differential circuit 22 shown in FIG. 4 of the previously described embodiment in that the current that flows through the transistor 2201 as it collector current is a constant current that flows into a constant-current circuit 2215 having one end grounded, and that the current that flows through the transistor 2208 as its collector current is a constant current that flows out of a constant-current source having one end connected to the power source.

Figure 14:
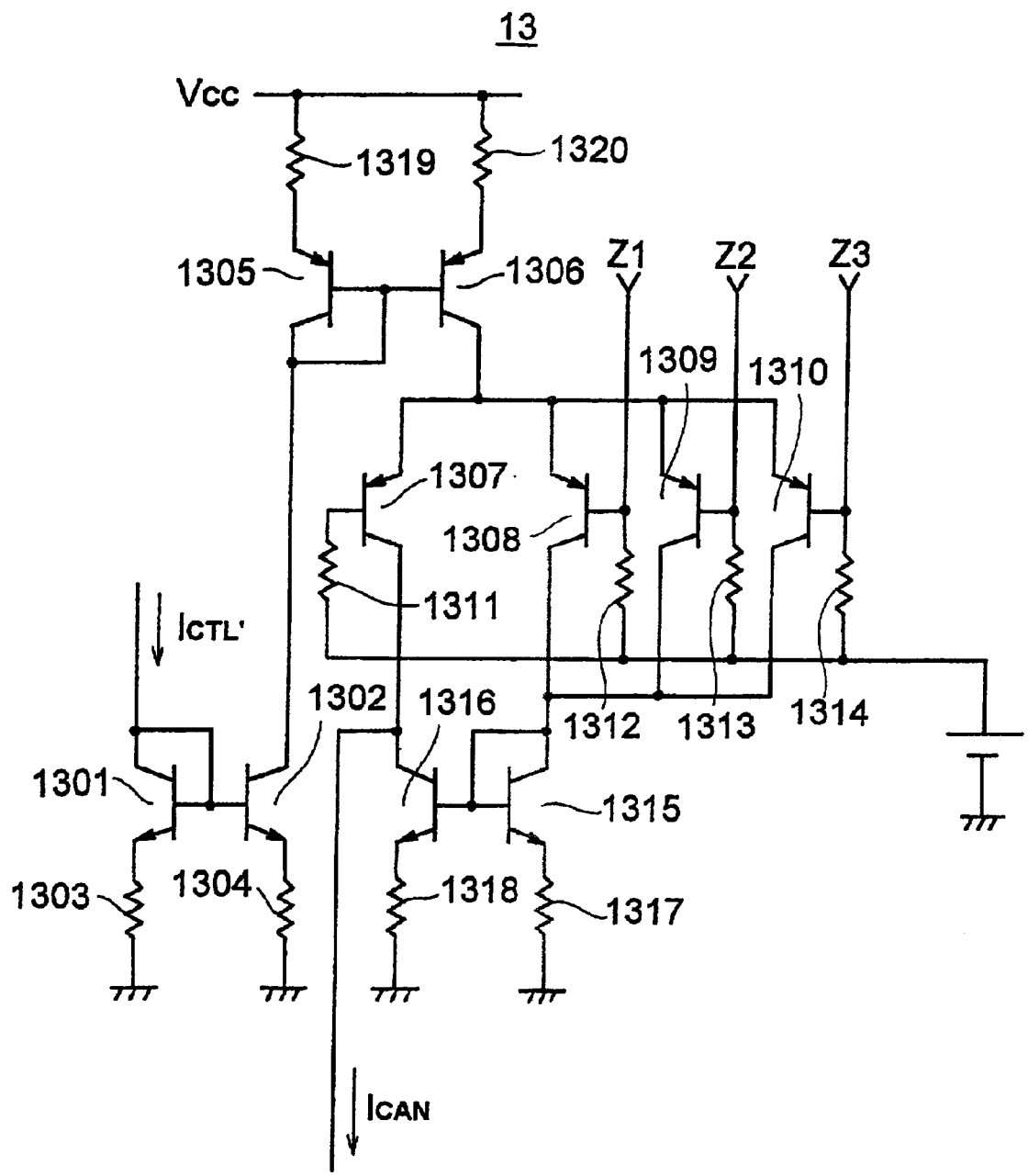
FIG. 14 is a circuit diagram of a ripple cancel circuit.

FIG. 14 shows the internal circuit configuration of the ripple cancel circuit 13. NPN-type transistors 1301 and 1302 constitute a current mirror circuit. The transistors 1301 and 1302 have their emitters grounded through resistors 1303 and 1304, respectively. The input-side transistor 1301 receives at its collector the output current $I_{CTL}'$ of the current supply circuit 15. The output-side transistor 1032 has its collector connected to the collector of a PNP-type transistor 1305. Although not illustrated, a terminal is provided at the node between the emitter of the transistor 1302 and the resistor 1304 so that a resistor can be connected thereto to adjust the ripple cancel factor.

The PNP-type transistor 1305, together with a PNP-type transistor 1306, constitutes a current mirror circuit. The transistors 1305 and 1306 have their emitters connected to the supplied voltage $V_{CC}$ through resistors 1319 and 1320, respectively. As described above, the collector of the input-side transistor 1305 is connected to the collector of the transistor 1302. To the collector of the output-side transistor 1306, the emitters of PNP-type transistors 1307, 1308, 1309, and 1310 are connected together.

The transistors 1308, 1309, and 1310 receive at their bases the absolute value signals Z1, Z2, and Z3, respectively, produced by the three-phase synthesizing circuit 2. Moreover, the transistors 1308, 1309, and 1310 have their bases connected to one end of resistors 1312, 1313, and 1314, respectively, which have their other end connected together. The transistor 1307 has its base connected to the node common to the resistors 1312, 1313, and 1314 through a resistor 1311. The node common to the resistors 1311, 1312, 1313, and 1314 is biased.

NPN-type transistors 1315 and 1316 constitute a current mirror circuit. The transistors 1315 and 1316 have their emitters grounded through resistors 1317 and 1318, respectively. To the collector of the input-side transistor 1315, the collectors of the transistors 1308, 1309, and 1010 are connected together. To the collector of the output-side transistor 1316, the collector of the transistor 1307 is connected. Thus, the ripple cancel circuit 13 outputs the difference current $I_{CAN}$ between the collector currents of the transistors 1307 and 1316, and this current $I_{CAN}$ is fed to the resistor 16.

Configured as described above, the ripple cancel circuit 13 operates in such a way that, the current $I_{CAN}$ output therefrom has a waveform, as shown in the timing chart of FIG. 12, similar to the waveform traced by the minimum values among the absolute value signals Z1, Z2, and Z3 produced by the three-phase synthesizing circuit 2. Thus, the current $I_{CAN}$ output from the ripple cancel circuit 13 is a signal having a triangular waveform with maxima thereof synchronized with the moments at which any of the hole signal H1, H2, and H3 has zero amplitude, i.e. the moments at which torque hits its minima.

Accordingly, the lower the torque in a given rotational position, the longer the length of time for which the upper output transistors are kept ON. This helps cancel shortage of torque wherever torque is low and thereby achieve smoother motor rotation. This is because, as the current $I_{CAN}$ output from the ripple cancel circuit 13 increases, the duty factor of the high-level period of the PWM signal $S_{PWM}$ relative to one period thereof becomes greater.

Moreover, in this embodiment, the level of the current $I_{CAN}$ output from the ripple cancel circuit 13 varies according to the torque control signal $T_{CTL}$, and this enhances the controllability of the rotation rate of the motor.

Figure 15:
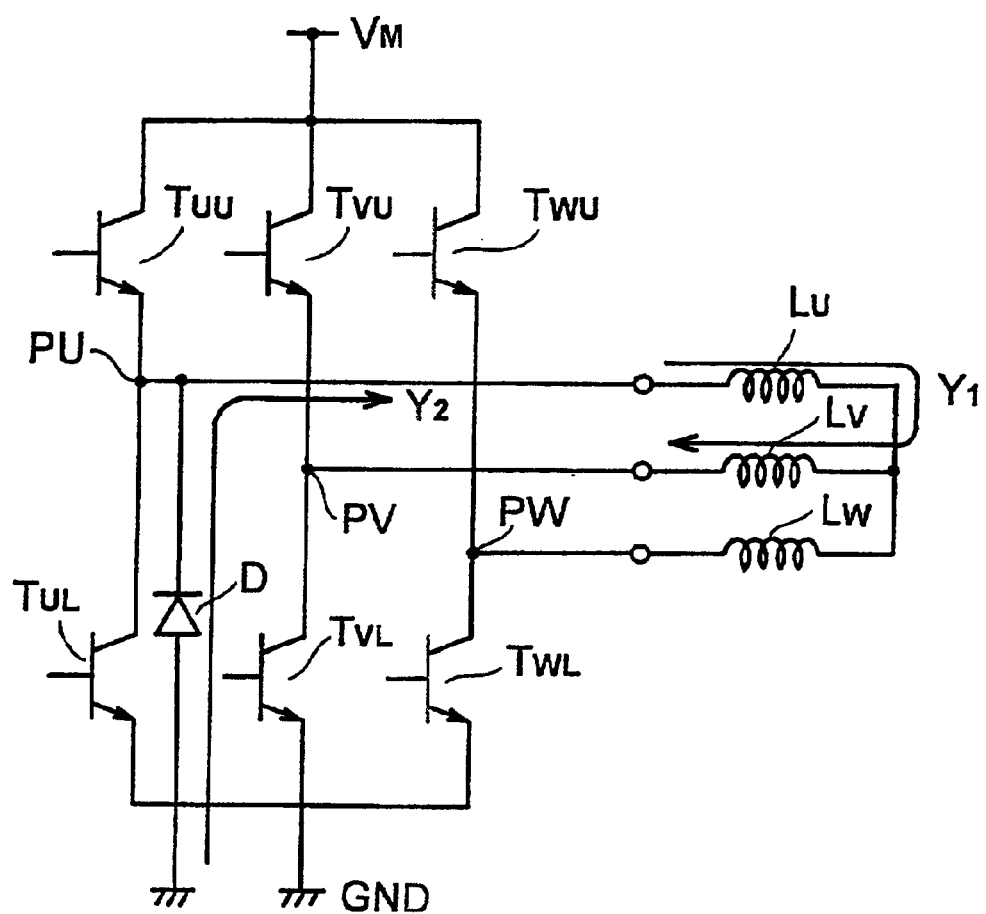
FIG. 15 is a circuit diagram of the output stage of a motor driving device.

In a case where the upper output transistors are switched between ON and OFF by PWM switching, it is preferable that, as in the embodiment described above, the resistor R for detecting the motor drive current be connected on the ground GND side. The reason is as follows. As shown in FIG. 15, for example, when the upper output transistor $T_{UU}$ is switched between ON and OFF by PWM switching, even after the upper output transistor $T_{UU}$ has turned from ON to OFF, the back electromotive force appearing in the coil $L_U$ causes a current to flow through a diode D parasitic in the lower output transistor $T_{UL}$ as indicated by an arrow $Y_2$. If the resistor R is connected on the motor drive voltage $V_M$ side, this current cannot be detected.

For a similar reason, in a case where the lower output transistors are switched between ON and OFF by PWM switching, it is preferable that the resistor for detecting the motor drive current be connected on the motor drive voltage side, because doing so makes more accurate detection of the motor drive current possible and thereby enhances controllability.

In the embodiment described above, the motor drive current is fed back. This, however, is not always necessary. In a case where the motor drive current is not fed back, the sum current of the output current $I_{CTL}$ of the control amplifier 4 and the output current $I_{CAN}$ of the ripple cancel circuit 13 is converted by the resistor 16 into a voltage, and this voltage is fed to the non-inverting input terminal (+) of the PWM comparator 7. Higher controllability is obtained, however, when the motor drive current is fed back.

What is claimed is:

1. A PWM motor driving device that controls an amount of electric power supplied to a motor by controlling an ON/OFF duty factor of an output transistor connected between a power source and the motor, comprising:

phase detecting means for detecting, among a plurality of phases of the motor, a phase which is currently being driven by the output transistor; and saturation preventing means for performing control according to a voltage of the phase detected by the phase detecting means in such a way that the output transistor is not saturated.

2. A PWM motor driving device comprising:

a plurality of pairs of output transistors, each pair connected between two different voltages of a power source, and having an output stage for outputting voltage to each phase of a motor from a node between an upper output transistor connected to a higher-voltage side of the power source and a lower output transistor connected to a lower-voltage side of the power source and having;

switching means for switching the upper and lower output transistors between ON and OFF according to a signal representing a rotational position of the motor;

controlling means for controlling an amount of electric power supplied from the power source to the motor by controlling an ON/OFF duty factor of the upper output transistor according to a torque control signal;

upper saturation preventing means for individually limiting voltages of a plurality of phases of the motor below a level above which the upper output transistor is saturated;

lower phase detecting means for detecting, among the plurality of phases of the motor, the phase which is currently being driven by the lower output transistor; and lower saturation preventing means for limiting the voltage of the phase detected by the lower phase detecting means above a level below which the lower output transistor is saturated.

3. A PWM motor driving device as claimed in claim 2, wherein the level below which the voltages of the individual phases of the motor are limited by the upper saturation preventing means and the level above which the voltage of the phase detected by the lower phase detecting means is limited by the lower saturation preventing means vary according to the torque control signal.

4. A PWM motor driving device as claimed in claim 2, wherein the upper and lower output transistors are bipolar transistors, the upper saturation preventing means is so configured as to control a base current of the upper output transistor in such a way that the voltages of the individual phases of the motor are limited below the level above which the upper output transistor is saturated, and the lower saturation preventing means is so configured as to control a base current of the lower output transistor in such a way that the voltage of the phase detected by the lower phase detecting means is limited above the level below which the lower output transistor is saturated.

5. A PWM motor driving device comprising:

a plurality of pairs of output transistors, each pair connected between two different voltages of a power source, and having an output stage for outputting voltage to each phase of a motor from a node between an upper output transistor connected to a higher-voltage side of the power source and a lower output transistor connected to a lower-voltage side of the power source and having;

switching means for switching the upper and lower output transistors between ON and OFF according to a signal representing a rotational position of the motor;

controlling means for controlling an amount of electric power supplied from the power source to the motor by controlling an ON/OFF duty factor of the lower output transistor according to a torque control signal;

lower saturation preventing means for individually limiting voltages of a plurality of phases of the motor above a level below which the lower output transistor is saturated;

upper phase detecting means for detecting, among the plurality of phases of the motor, the phase which is currently being driven by the upper output transistor; and upper saturation preventing means for limiting the voltage of the phase detected by the upper phase detecting means below a level above which the upper output transistor is saturated.

6. A PWM motor driving device comprising:

a plurality of pairs of output transistors, each pair connected between two different voltages of a power source, and having an output-stage for outputting voltage to each phase of a motor from a node between an upper output transistor connected to a higher-voltage side of the power source and a lower output transistor connected to a lower-voltage side of the power source and having;

switching means for switching the upper and lower output transistors between ON and OFF according to a signal representing a rotational position of the motor;

controlling means for controlling an amount of electric power supplied from the power source to the motor by controlling an ON/OFF duty factor of the upper and lower output transistors according to a torque control signal;

upper phase detecting means for detecting, among a plurality of phases of the motor, the phase which is currently being driven by the upper output transistor;

upper saturation preventing means for limiting the voltage of the phase detected by the upper phase detecting means below a level above which the upper output transistor is saturated;

lower phase detecting means for detecting, among the plurality of phases of the motor, the phase which is currently being driven by the lower output transistor; and lower saturation preventing means for limiting the voltage of the phase detected by the lower phase detecting means above a level below which the lower output transistor is saturated.

* * * * *